US008489151B2

(12) United States Patent
Van Engelen et al.

(10) Patent No.: US 8,489,151 B2
(45) Date of Patent: *Jul. 16, 2013

(54) INTEGRATED AND DETACHABLE WIRELESS HEADSET ELEMENT FOR CELLULAR/MOBILE/PORTABLE PHONES AND AUDIO PLAYBACK DEVICES

(75) Inventors: Josephus A. Van Engelen, Aliso Viejo, CA (US); Jeyhan Karaoguz, Irvine, CA (US); Nambirajan Seshadri, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1590 days.

This patent is subject to a terminal disclaimer.

(21) Appl. No.: 11/120,455

(22) Filed: May 3, 2005

(65) Prior Publication Data

US 2006/0166715 A1 Jul. 27, 2006

Related U.S. Application Data

(60) Provisional application No. 60/646,465, filed on Jan. 24, 2005.

(51) Int. Cl.
| | |
|---|---|
| H04B 5/00 | (2006.01) |
| H04W 4/00 | (2009.01) |
| H04M 1/00 | (2006.01) |
| H04M 9/00 | (2006.01) |
| H04R 25/00 | (2006.01) |
| G10L 21/02 | (2013.01) |

(52) U.S. Cl.
USPC ............ 455/569.1; 455/41.1; 455/426.1; 455/550.1; 455/575.1; 379/433.02; 381/312; 381/374; 704/226

(58) Field of Classification Search
USPC .............. 455/41.1, 41.2, 41.3, 67.11, 403, 455/411, 414.1, 456.1, 550.1, 557, 567, 569.1, 455/570, 573, 575.1, 575.2, 575.3, 3.05, 455/100, 223, 260, 404.1, 462, 556.1, 569.2, 455/575.7, 3.06, 70, 74.1, 90.3, 412.1, 420, 455/519, 556.2, 558, 572, 575.6; 381/23.1, 381/79, 315, 311, 332, 87, 150, 375, 1.74, 381/86, 151, 312, 314, 322, 370, 384; 379/88.07, 355.02, 142.01, 419, 430, 185, 379/387.01, 394, 398, 426, 428.02, 433.12, 379/433.13; 704/226, 228, 231, 270
See application file for complete search history.

(56) References Cited

U.S. PATENT DOCUMENTS 5,568,516 A * 10/1996 Strohallen et al. ............ 375/259
5,794,163 A * 8/1998 Paterson et al. ............ 455/575.2
(Continued)

FOREIGN PATENT DOCUMENTS

| DE | 19645259 A1 | 5/1998 |
|---|---|---|
| DE | 10114109 A1 | 9/2002 |
| EP | 1213896 A1 | 6/2002 |

*Primary Examiner* — Andrew Wendell
*Assistant Examiner* — Paul P Tran
(74) *Attorney, Agent, or Firm* — Garlick & Markison; Holly L Rudnick

(57) ABSTRACT

A modular wireless headset having integrated but detachable elements is operable to service a cellular wireless terminal, streamed media or playback device. This modular wireless headset may include a wireless microphone and a wireless earpiece. The wireless earpiece may physically couple to the wireless microphone and a base unit in order to exchange information and share power resources. A power distribution controller allocates power between the wireless earpiece, wireless microphone, and base unit when physically coupled to operate or charge internal power supplies of the components.

24 Claims, 13 Drawing Sheets

U.S. PATENT DOCUMENTS

| | | | |
|---|---|---|---|
| 5,881,149 A * | 3/1999 | Weatherill | 379/433.02 |
| 6,078,825 A * | 6/2000 | Hahn et al. | 455/569.2 |
| 6,424,820 B1 | 7/2002 | Burdick et al. | |
| 6,757,517 B2 * | 6/2004 | Chang | 455/3.05 |
| 6,845,242 B1 * | 1/2005 | Carley | 455/462 |
| 6,862,445 B1 * | 3/2005 | Cohen | 455/412.1 |
| 6,980,204 B1 * | 12/2005 | Hawkins et al. | 345/211 |
| 7,076,277 B2 * | 7/2006 | Kim et al. | 455/569.1 |
| 7,095,981 B1 * | 8/2006 | Voroba et al. | 455/41.2 |
| 2002/0168939 A1 * | 11/2002 | Gioscia et al. | 455/41 |
| 2002/0196955 A1 | 12/2002 | Boesen et al. | |
| 2003/0050011 A1 * | 3/2003 | Palermo et al. | 455/41 |
| 2003/0068974 A1 * | 4/2003 | Kanamaluru et al. | 455/3.06 |
| 2004/0052382 A1 * | 3/2004 | Wang | 381/86 |
| 2004/0063456 A1 * | 4/2004 | Griffin et al. | 455/550.1 |
| 2004/0137967 A1 * | 7/2004 | Bodley | 455/575.2 |
| 2004/0185919 A1 * | 9/2004 | Yoo | 455/575.1 |
| 2004/0203357 A1 * | 10/2004 | Nassimi | 455/41.1 |
| 2004/0242264 A1 * | 12/2004 | Cho | 455/550.1 |
| 2005/0026560 A1 * | 2/2005 | Villaverde et al. | 455/3.06 |
| 2005/0037783 A1 * | 2/2005 | Carley | 455/462 |
| 2005/0064915 A1 * | 3/2005 | Lair | 455/569.1 |
| 2005/0130593 A1 * | 6/2005 | Michalak | 455/66.1 |

* cited by examiner

INTEGRATED AND DETACHABLE WIRELESS HEADSET ELEMENT FOR CELLULAR/MOBILE/PORTABLE PHONES AND AUDIO PLAYBACK DEVICES

CROSS REFERENCES TO RELATED APPLICATIONS

This application claims the benefit of priority to U.S. Provisional Patent Application No. 60/646,465 entitled "Integrated and Detachable Wireless Headset Element for Cellular/Mobile/Portable Phones And Audio Playback Devices," by Josephus A. Van Engelen, et al. filed on Jan. 24, 2005, and is incorporated herein by reference in its entirety for all purposes.

This Application is related to the following applications:

1. application Ser. No. 10/981,418 entitled "Universal Wireless Multimedia Device," by Nambirajan Seshadri, et al., filed on Nov. 4, 2004, which claims priority pursuant to 35 U.S.C. §120, as a continuation-in-part (CIP) to the following applications:
   a. U.S. application Ser. No. 10/856,430 entitled "Providing a Universal Wireless Headset," by Nambirajan Seshadri, et al., filed May 28, 2004, which claims priority pursuant to 35 USC §119(e) to the U.S. Provisional Application No. 60/473,967 filed on May 28, 2003; and
   b. U.S. application Ser. No. 10/856,124 entitled "Modular Wireless Headset and/or Headphones", filed May 28, 2004, which claims priority pursuant to 35 USC §119(e) to U.S. Provisional Application No. 60/473,675 filed May 28, 2003.
2. application Ser. No. 10/976,300 entitled "Modular Wireless Multimedia Device," by Nambirajan Seshadri, et al., filed on Oct. 27, 2004, which claims priority pursuant to 35 U.S.C. §120, as a continuation-in-part (CIP) to the following applications:
   a. U.S. application Ser. No. 10/856,124 entitled "Modular Wireless Headset and/or Headphones," filed May 28, 2004, which claims priority pursuant to 35 USC §119(e) to U.S. Provisional Application No. 60/473,675, filed on May 28, 2003; and
   b. U.S. application Ser. No. 10/856,430 filed May 28, 2004 entitled "Providing a Universal Wireless Headset, which claims priority pursuant to 35 USC §119(e) to U.S. Provisional Application No. 60/473,967 filed May 28, 2003.
3. application Ser. No. 11/120,765 entitled "Modular Earpiece/Microphone that Anchors Voice Communications," by Nambirajan Seshadri, et al., filed on May 3, 2005, which claims priority pursuant to 35 USC §119(e) to U.S. Provisional Application No. 60/656,828 filed on Feb. 25, 2005.
4. application Ser. No. 11/122,146 entitled "Handover of Call Serviced by Modular Earpiece/Microphone Between Servicing Base Portions," by Nambirajan Seshadri, et al., filed on May 4, 2005, now U.S. Pat. No. 7,555,318, which claims priority under 35 USC §119(e) to U.S. Provisional Application No. 60/653,234 filed on Feb. 15, 2005.
5. application Ser. No. 11/120,900 entitled "Modular Earpiece/Microphone (Headset) Operable to Service Voice Activated Commands," by Nambirajan Seshadri, et al., filed on May 3, 2005,
6. application Ser. No. 11/120,903 entitled "Battery Management in a Modular Earpiece Microphone Combination," by Nambirajan Seshadri, et al., filed on May 3, 2005 which claims priority under 35 USC §119(e) to Provisional Application No. 60/646,270 filed on Jan. 24, 2005.
7. application Ser. No. 11/120,904 entitled "Pairing Modular Wireless Earpiece/Microphone (Headset) to a Serviced Base Portion and Subsequent Access Thereto," by Nambirajan Seshadri, et al., filed on May 3, 2005, which claims priority under 35 USC §119(e) to Provisional Application No. 60/646,437 filed on Jan. 24, 2005.
8. application Ser. No. 11/120,902 entitled "Managing Access of Modular Wireless Earpiece/Microphone (Headset) to Public/Private Servicing Base Station," by Nambirajan Seshadri, et al., filed on May 3, 2005, which claims priority under 35 USC §119(e) to Provisional Application No. 60/646,235 filed on Jan. 24, 2005.
9. application Ser. No. 11/120,676 entitled "Earpiece/Microphone (Headset) Servicing Multiple Incoming Audio Streams," by Nambirajan Seshadri, et al., filed on May 3, 2005, now U.S. Pat. No. 7,558,529, which claims priority under 35 USC §119(e) to Provisional Application No. 60/646,272 filed on Jan. 24, 2005. all of which are incorporated herein by reference in their entirety for all purposes.

BACKGROUND OF THE INVENTION

1. Field of the Invention

This invention generally relates to wireless communications and more particularly to the pairing and registration of modular wireless headset components to support voice communications.

2. Background of the Invention

Battery powered wireless communications offer users the ability to be "wired" from almost anywhere in the world. Cellular telephones, satellite telephones, wireless local area networks, personal digital assistants (PDAs) with radio frequency (RF) interfaces, laptop computers with RF interfaces and other such battery powered devices enable these wireless communications. Such wireless communications have been extended to personal wireless networks, such as these defined by the Bluetooth specification. Not only have cellular telephones become very popular, but Wireless Local Area Networking (WLAN) devices have also proliferated. One standard for wireless networking, which has been widely accepted, is the Specification of the Bluetooth System, v. 1.0 ("Bluetooth Specification").

The Bluetooth Specification enables the creation of small personal area networks (PAN's) where the typical operating range of a device is 100 meters or less. In a Bluetooth system, Bluetooth devices sharing a common channel sequence form a piconet. Two or more piconets co-located in the same area, with or without inter-piconet communications, is known as a scatternet.

The Bluetooth Specification supports voice communications between Bluetooth enabled devices. When a pair of Bluetooth devices supports voice communication, the voice communications must be wirelessly supported in a continuous fashion so that carried voice signals are of an acceptable quality. One popular use of personal wireless networks couples battery powered wireless headset(s) with cellular telephone(s), personal computer(s), and laptop(s), etc. These standalone devices each typically require batteries to operate. Because these standalone devices each consume power differently, coordinating power consumption would be desirable.

In most cases, the device is simply a replacement for a wired headset. Such Bluetooth devices, while providing benefits in mobility of the user, provides little additional benefit over wired devices. In fact, portability and wearability are often negatively impacted by internal power consumption and battery capacity. Thus, there is a need for portability and wearability of headset devices that support audio or multimedia communications and also provide improved service quality through extended battery life.

BRIEF SUMMARY OF THE INVENTION

Embodiments of the present invention are directed to systems and methods that are further described in the following description and claims. Advantages and features of embodiments of the present invention may become apparent from the description, accompanying drawings and claims.

Other features and advantages of the present invention will become apparent from the following detailed description of the invention made with reference to the accompanying drawings.

DETAILED DESCRIPTION OF THE INVENTION

Figure 1:
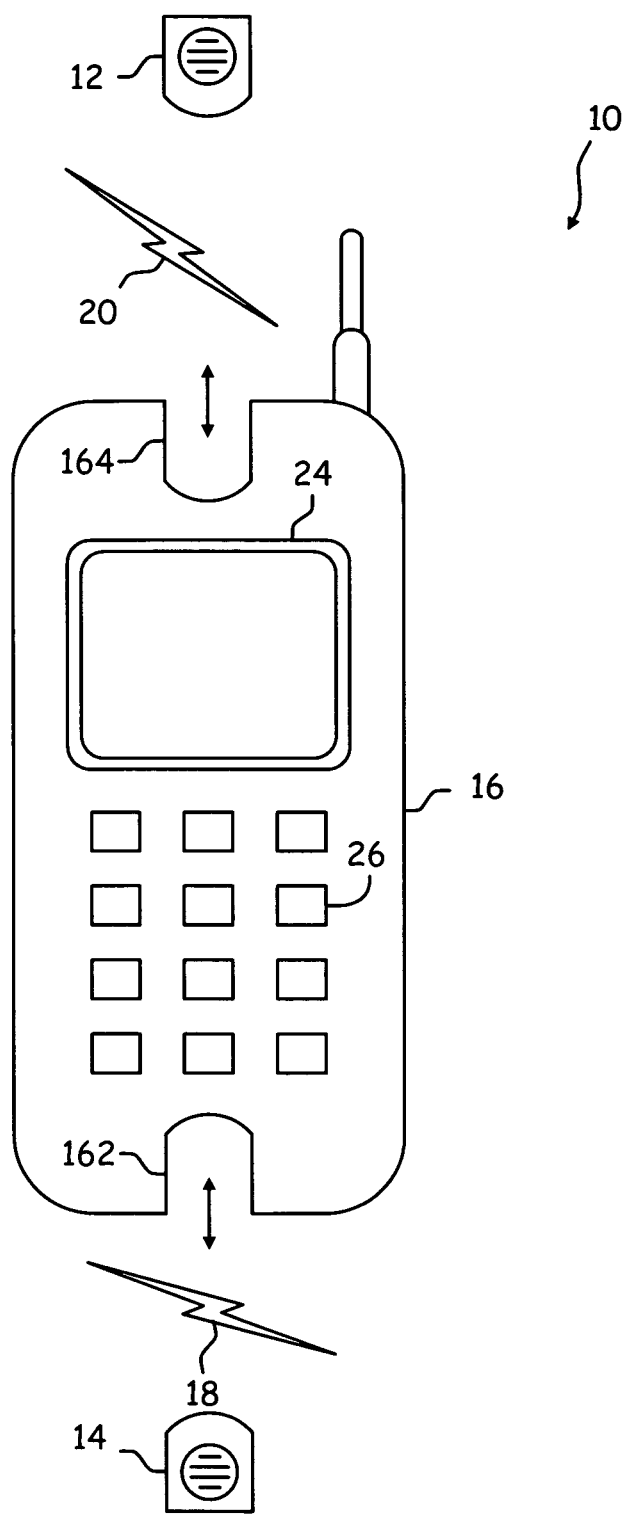
FIG. 1 is a diagram of a wireless headset in accordance with one embodiment of the present invention.

FIG. 1 is a diagram of a modular wireless headset 10 wirelessly coupled to base unit 16 that includes wireless earpiece 12 and wireless microphone 14. Wireless earpiece 12 communicates wirelessly with microphone 14. However, wireless earpiece 12 and wireless microphone 14 may also physically couple to exchange information or share resources through an alternate connection. In one embodiment, receptacles within a base unit facilitate the distribution of power and communications between the wireless earpiece 12, wireless microphone 14, and the base unit. A portable power supply, such as but not limited to a battery, is provided within the wireless earpiece and/or the wireless microphone. This portable power supply is operable to power wireless earpiece 12 and wireless microphone 14 when the wireless earpiece and wireless microphone are coupled via the base unit.

Accordingly, earpiece 12 and microphone 14 may be separate communication devices. As separate devices, those devices may clip to a user or have other fastening means that facilitate the user wearing the device. Clips are shown on both earpiece 12 and microphone 14 to secure these devices to the user. Those devices may individually communicate with base unit 16 via separate communication pathways or through a single wireless interface contained either in the earpiece, microphone, or base unit.

Earpiece 12, microphone 14, and base unit may integrate to form a wireless (e.g. Bluetooth) headset with audio functions. FIG. 1 shows that the components may be detachable from a phone or playback device. However, these components retain the ability to share power from the base unit. Thus a common charger and overall battery capacity may be shared. The headset may normally be physically coupled to the phone or playback devices and may or may not provide the normal audio (and/or video) functionality for the main device when attached. When 'docked' the battery headset unit may be charged from the main device battery (or wall charger when plugged in). The headset may detach from the base unit and be worn.

Figure 2:
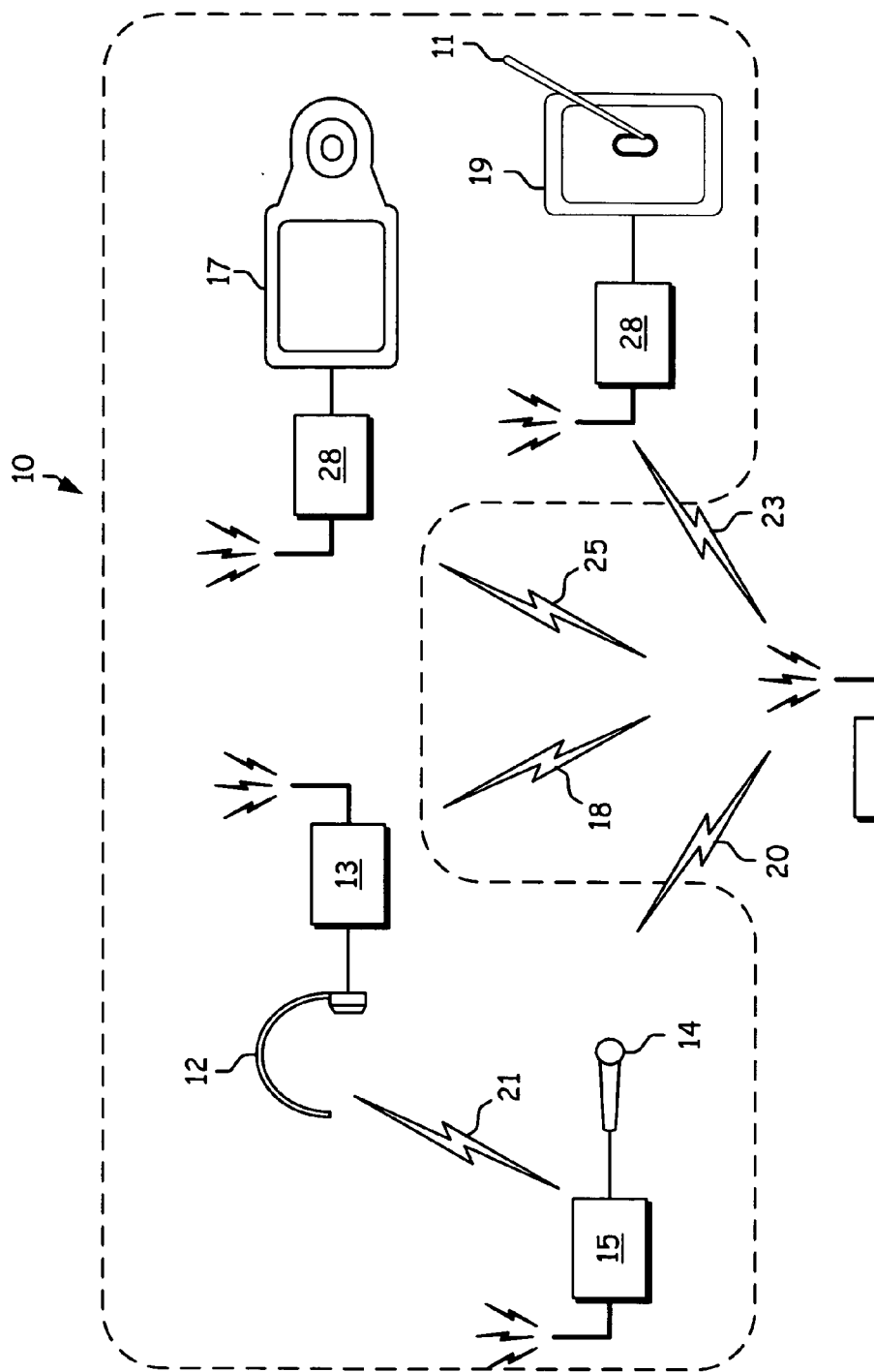
FIG. 2 is a diagram of another modular wireless headset in accordance with one embodiment of the present invention.

As shown, earpiece 12 and microphone 14 may both communicate with base unit 16, which may be a cellular telephone, wire line telephone, laptop computer, personal computer, personal digital assistant, etc., using transceiver (transmitter and/or receiver) 13 of FIG. 2 via a first communication pathway 18. The base unit may physically couple to earpiece 12 and/or microphone 14. When physically coupled, the base unit may serve as an external portable power supply to the wireless modular headset. This external portable power supply may include receptacles for the both the wireless earpiece and wireless microphone as well as a battery that can provide power to operate the modular wireless headset or recharge the portable power supplies of the modular wireless headset through the physical coupling. Such an embodiment will be discussed in more detail in FIG. 11. A display/interface on the battery may allow user commands to be received and directed to the modular wireless headset and the display of information from the modular wireless headset as well as the portable power supply to be presented to the user. The external power supply may physically couple directly to the modular wireless headset or may couple through the tether via an adapter. This adapter may take the form of a universal serial bus (USB) connector that allows the modular wireless headset to be recharged from laptops, personal computers, or other devices having USB or like connectors.

Base unit 16 may also directly couple the headset to voice communication networks such as radio, cellular, wireless voice or packet data, public switched telephone networks (PSTN), private branch exchanges or others known to those skilled in the art. Although shown as being external to earpiece 12, transceivers 13 and 15 may be integrated within earpiece 12 and microphone 14. Base unit 16 is operable to establish a wireless pathway to earpiece 12 and/or microphone 14 through the antennas. This pathway may be direct or via another wireless component and pathway, such as pathway 21. For example, wireless microphone 14 may communicate via base unit 16 through a wireless pathway between earpiece 12 and base unit 16. Similarly, wireless earpiece 12 could communicate with base unit 16 through wireless microphone 14. Microphone 14 may communicate with the base unit 16 or earpiece 12 using transceiver (or transmitter) 15 of FIG. 2 via communication pathway 20 or 21, respectively. Either or both earpiece 12 and microphone 14 may have a user interface. If the communication pathways are established in accordance with the Bluetooth specification, communication resources 18, 20, and 21 may be different timeslot allocations on the same synchronous connection orientated (SCO) link, or may be separate SCO links.

Earpiece 12 and microphone 14 both contain a pairing circuit. These pairing circuits are operable to pair the wireless earpiece and microphone when pairing information associated with the individual earpiece 12 and microphone 14 compare favorably. If the pairing information associated with the individual earpiece 12 and microphone 14 compares unfavorably, these individual components may not pair to form a modular wireless headset. Pairing allows the microphone and earpiece, after the wireless earpiece and microphone are successfully paired, to establish a wireless connection between them. Also in the event that one of the modular components needs to be added or replaced to the modular wireless headset 10, this component would have to pair to the other components present.

Pairing quite simply is the act of introducing two wireless devices to one another so that they can then communicate. Pairing enables the two or more wireless devices to join and become a trusted pair. Within a trusted pair, each device recognizes the other device(s). Then, each device can automatically accept communication and bypass the discovery and authentication process that normally happen during an initial wireless interaction between devices. Once the trusted pair is established, some embodiments may require user authentication before other devices are allowed to enter into the trusted pair. This prevents, for example, a second wireless earpiece, not of the trusted pair, from establishing communications with wireless headset 10. This could result in an untrusted earpiece eavesdropping on the voice communication serviced by modular wireless headset 10. Thus, pairing enables security and privacy for voice communications serviced by modular wireless headset 10. Additionally, some embodiments may only pair when a discoverability function associated with the wireless device is enabled. For example, the device may pair when physically coupled or when a user toggles a pairing switch located on user interface. When the discoverability/pairing function is not enabled, the wireless devices will not accept communications from unknown devices.

User interface may also allow a user to initiate call functions or network hardware operations. These call functions include call initiation operations, call conferencing operations, call forwarding operations, call hold operations, call muting operations, and call waiting operations. Additionally, user interface allows the user to access network interface functions, hardware functions, base unit interface functions, directory functions, caller ID functions, voice activated commands, playback commands and device programming functions. User interface can be any combinations of a visual interface as evidenced by display 24, tactile interface as evidenced by buttons 26, and/or an audio interface.

Each of these devices, earpiece 12, microphone 14 and base unit 16, may support one or more versions of the Bluetooth Specification or other wireless protocols. A Bluetooth "scatternet" is formed from multiple "piconets" with overlapping coverage. A user of modular wireless headset 10 may establish communications with any available base unit 16. Wireless headset 10 may have a minimal user interface where a single authenticate or register button initiates registration. Modular wireless headset 10 includes a registration circuit. This registration circuit needs to reside in either or both the wireless microphone and wireless earpiece. The registration circuit receives and exchanges registration information with base unit 16. Once this information is exchanged, the modular wireless headset, as well as base unit 16, compares their registration information with the exchanged information to determine whether or not modular wireless headset 10 is authorized to use base unit 16. Authorization will occur when the registration information within the modular wireless headset compares favorably to that of the base unit. This may involve accessing a third-party database in order to confirm where the base unit establishes communications between a servicing network, such as a cellular or public switch telephone network (PSTN) network, or a local authentication via a local database that may compare biometric, password user interface, VRS voice pattern recognition, encryption key/dongle, in order to allow modular wireless headset 10 to access resources available through base unit 16.

Registration may determine what resources the headset may access. For example, access may be granted to an available one cellular network but not a wireless packet data network. Registration may require physically coupling modular wireless headset 10 to base unit 16 or establishing wireless communications. In the case where wireless communications are established, this may require additional user input or proximity testing to authenticate and register the modular wireless headset to the base unit. The base unit, as well as the modular wireless headset, may access memory either local or via server or network to validate the registration information associated with the other component. Thus, both the base unit needs to compare the registration information and result in a favorable comparison, as well as the modular wireless headset comparing the registration information in order to result in a favorable comparison. For example, where fees are required for access, the user may not authenticate registration to avoid the fee. Registration allows communications to be automatically exchanged between the modular wireless headset and the base unit. This improves both security and privacy for communications serviced using the modular wireless headset.

Wireless headset 10 may reside within the service coverage area of multiple base units. Thus, when headset 10 enters (or powers up in) an area with more than one functioning wireless network, a user may depress authenticate button 26, use a voice command or other means to start the authentication/registration process. With the button depressed, the wireless headset attempts to establish communications with base unit 16. Subsequent authentication operations are required to have the wireless headset join the selected network. These subsequent operations may include prompting the user for selection of the network, requiring that an entry be previously made in an access list to allow wireless headset 10 to join or otherwise complete the authentication operations (registration).

Once wireless headset 10 joins a respective network, headset 10 may service voice communications with the base unit via respective WLAN links. Such calls will be received and managed by base unit 16 or headset 10. Management duties for the calls may be divided between base unit 16 and headset 10. For example, upper level portions of the cellular protocol stack may be supported by the headset while the lower level portions are supported by the base unit. Integrated circuits in either headset 10 or base unit 16 support call functions. These call functions include, but are not limited to, call initiation and termination, call conferencing operations, call forwarding operations, call hold operations, call muting operations, or call waiting operations, and may be initiated through user interface.

FIG. 2 is a diagram of a modular wireless headset that includes earpiece 12, microphone 14 that may be physically coupled by tether. This headset may also include display/camera 17, and portable touch-screen/whiteboard 19 with stylus 11 to support net-meetings. Microphone 14, earpiece 12, display/camera 17 and portable touch-screen/whiteboard 19 may each be a separate physical device that communicates wirelessly when paired to form a modular wireless headset. Earpiece 12 is a separate device from microphone 14, that together function to provide the modular wireless headset shown in FIG. 1. Accordingly, earpiece 12, microphone 14, display/camera 17, and a portable touch-screen/whiteboard 19 are separate communication devices that may individually communicate with base units via separate or shared communication pathways. A single communication pathway using time division may be used to communicate between earpiece 12, microphone 14, display/camera 17, portable touch-screen/whiteboard 19 and base units (base units 30-37 or access point 21). These communications are secured by both pairing and registration. Encryption, validation, or other like methods known to those skilled in the art may also be used and support one-way or two-way audio, video or text communications. One way communications allow the headset to act as receivers to broadcast information, while two-way communications allow real-time voice communications, such as phone or radio communications, which may be augmented with data, text and video to support interactive net-meetings.

Figure 3:
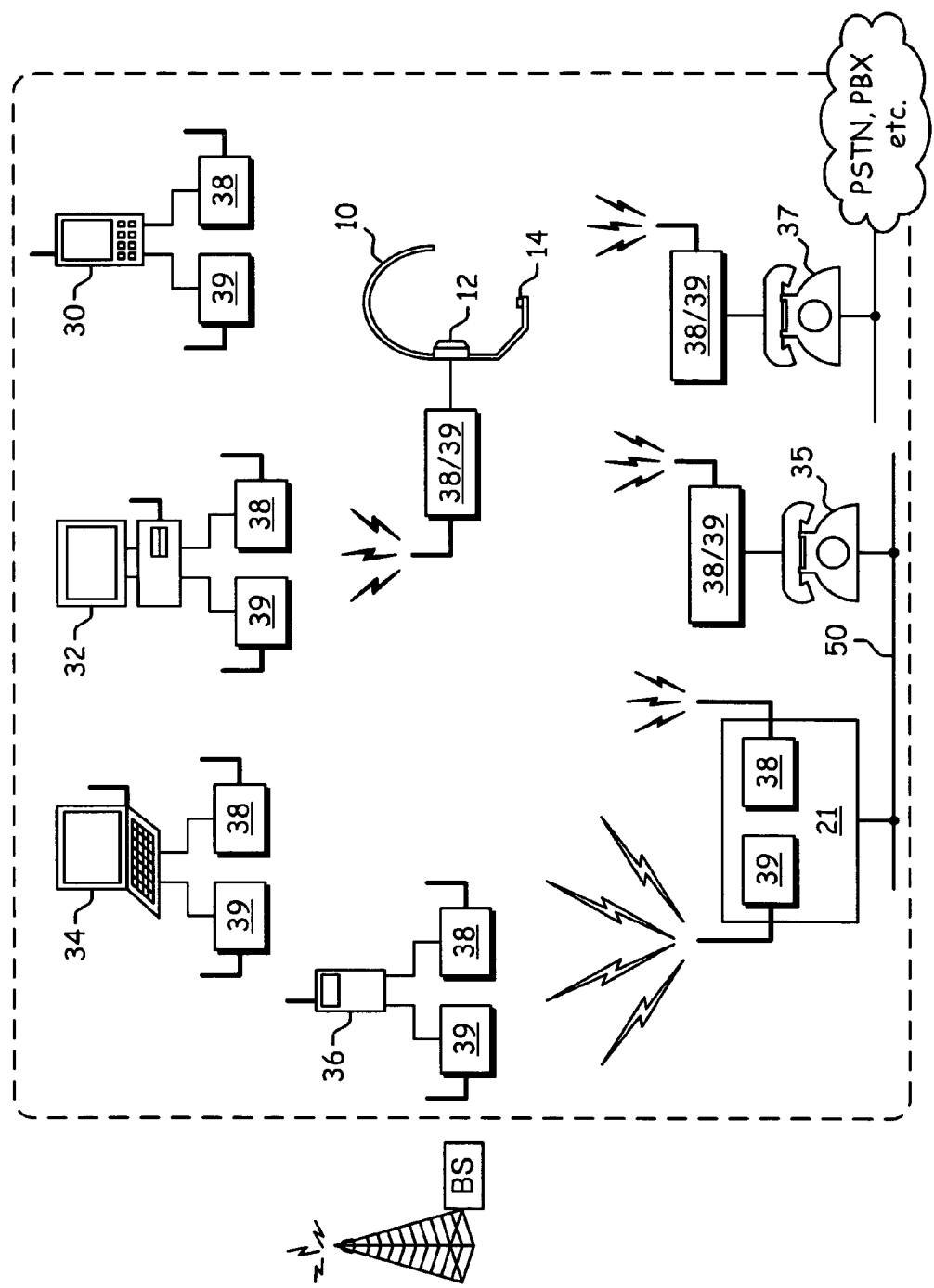
FIG. 3 is a diagram of a wireless headset operable to couple to various devices in accordance with one embodiment of the present invention.

Earpiece 12, once paired to form a modular wireless headset and registered to a base unit, may automatically communicate with base unit 16 and attached resources. FIG. 3 depicts those resources as a cellular telephone network, wire line telephone, Ethernet telephone, laptop computer, personal computer, personal digital assistant, etc, using transceiver (or receiver) 13 via a first communication pathways 18. Base unit 16 may establish a wireless pathway to earpiece 12 or microphone 14. The microphone 14, once authorized or validated, may communicate with the base unit 16 using transceiver (or transmitter) 15 via a second communication pathway 20 or by sharing communication pathway 18 with earpiece 12. Display/camera 17 and portable touch-screen/whiteboard 19 may communicate with the base unit 16 using transceivers (receivers and/or transmitters) 28 via communication pathways 25 and 23, respectively, or by relaying communications through another wireless component.

If the communication pathways are established in accordance with the Bluetooth specification, communication resources may be different timeslot allocations on the same synchronous connection orientated (SCO) link, or may be separate SCO links. These communication pathways may be secured by encryption, validation, pairing, or other like means to secure the communications exchanged with the base unit. Validation or pairing may prevent unauthorized devices from communicatively coupling to the base unit.

The quality of data provided to these devices may be adjusted according to which devices are actually present and supported. For example, audio quality can be improved and may even support stereo (multi-channel audio). This option may limit resources provided to microphone 14, display/camera 17, or whiteboard 19 to service multi-channel audio. Another example may favor the use of only earphone 12 and display/camera 17 to render streamed video and audio content. To coordinate the presentation of both audio and video in such an example, earphone 12 and display/camera 17 and their received communications may be synchronized to provide a quality viewing experience. Similarly, to coordinate the presentation of multiple audio channels, earphones 12 may be synchronized in order to provide a quality experience. To coordinate the presentation of real-time two-way audio earphones 12 and microphone 14 may be synchronized such that unacceptable delays do not exist within exchanged voice communications. This coordination ensures there is no undue delay between the presentations provided by these individual devices allowing the user to perceive a seamless presentation. This embodiment allows the multimedia device to support net-meetings that require the delivery of complete Internet conferencing solutions with multi-point data conferencing, text chat, whiteboard, and file transfer, as well as point-to-point audio and video. Additionally, this allows the multimedia device to coordinate the presentation of these different media formats without necessarily requiring shared physical connections of these devices.

Direct connectivity previously limited the physical structure that could be used for a wireless headset to support net-meetings. In many cases, this results in headsets that are cumbersome to use and uncomfortable to wear. The protocol used between modular components (base units, host devices, access points and other communicatively coupled devices) may allow the base unit to send data to each device in a coordinated manner that allows for the synchronized presentation of multimedia content by the devices. Alternatively, the information may be supplied to one component and then distributed within the trusted pair devices that make up the modular wireless headset. For example, one embodiment may allocate a predetermined portion of each data transmission for each media format. This would allow base unit 16 to transmit the same data to each device, wherein each device only processes that content intended for that device. In another embodiment, base unit or access point communicates in parallel with each device. By coordinating the data or packets exchanged with the devices, their individual presentations may be synchronized.

Direct connectivity may still be desired to share resources such as batteries or onboard power supplies. This allows components of the modular wireless headset to extend the battery life of the modular wireless headset. Such direct connectivity may be through a direct physical connection as shown in FIG. 3 or a tethered connection as shown in FIGS. 1 and 2. Power from power supplies located within the wireless microphone, wireless earpiece, or optionally coupled based unit may be shared between the wireless microphone and wireless earpiece through the physical coupling provided by the tether. The portable power supplies within the wireless microphone, wireless earpiece or base unit may be used also to recharge the portable power supplies within the microphone or earpiece. This may be done based on many different criteria. For example, which battery or portable power supply has a lesser charge may be used as the determining criteria. Other criteria may be based standby time associated with individual components, historical user profile, mode of operation as specified by user, or other such reasons known to those having skill in the arts. The base unit may further have receptacles through which the earpiece and microphone may physically couple to the base unit. Such receptacles may receive the wireless earpiece and microphone, a battery, and a display interface through which a user may input commands directed to the modular wireless headset and display information received from the modular wireless headset.

Earpiece 12 and microphone 14 may have on-chip operations to support call conferencing, call waiting, flash, and other features associated with telephones or net-meetings.

These functions may me accessed and reviewed by a user interface and display within the base unit or a user interface and display located on or coupled to either earphone 12 or microphone 14. The user interface and display, located on or coupled to either the base unit or earphone 12 or microphone 14 may have a display and button(s) that may be used to program device, perform directory functions including selecting number to call, view caller ID, initiate call waiting, or initiate call conferencing. Additionally, circuitry within earphone 12 or microphone 14 may enable voice activated dialing. The actual voice recognition could be performed within earphone 12, microphone 14, or a base unit. Thus, earphone 12 or microphone 14 may act to initiate calls and receive calls. A link between earphone 12 and microphone 14 would allow earphone 12 or microphone 14 to share resources, such as batter life, and allow earphone 12 or microphone 14 to be recharged from a base unit.

Each of the devices 30-37 also includes piconet RF interface 38 and/or wireless interface 39. Piconet RF interface 38 may be constructed to support one or more versions of the Bluetooth specification. As such, each of the piconet RF interfaces 38-36 include a radio frequency transceiver that operates at 2.4 gigahertz and baseband processing for modulating and demodulating data that is transceived within a piconet. As such, wireless headset 10 may be wirelessly coupled with any one of the devices 30-37 and act as the headset communicatively coupled and registered to the devices 30-37.

Devices 30-37 may further include a wireless LAN (WLAN) RF interface 39. The wireless LAN RF interfaces 39 may be constructed in accordance with one or more versions of IEEE802.11(a), (b), and/or (g) or other WLAN protocol known to those skilled in the art. Accordingly, each of the WLAN RF interfaces 39 include an RF transceiver that may operate in the 2.4 gigahertz range and/or in the 5.25 or 5.75 gigahertz range and further includes baseband processing to modulate and demodulate data that is transceived over the corresponding wireless communication link.

Contrasting the functionality of the piconet RF interfaces with the WLAN RF interfaces, piconet RF interfaces allow point-to-point communication between the associated devices, while the WLAN RF interfaces enable the associated devices to communicate indirectly via base units. For example, via piconet RF interfaces 38 laptop 34 can communicate directly with cellular telephone 36. In contrast, via WLAN RF interfaces 39, laptop 34 communicates indirectly, via access point 21, with cellular telephone 36. In general, the coverage area of a piconet is significantly smaller than the coverage area of a WLAN. Thus, for example, if headset 10 and cellular telephone 36 were unable to establish a piconet connection via piconet RF interfaces 38 due to distance between the devices. These devices would be able to establish a wireless communication link via the WLAN RF interfaces 39 and access point 21. Dual communication pathways allow communications to be switched between pathways, dependent on factors such as audio quality, signal strength, and available bandwidth.

Wireless headset 10 may establish a piconet with any one of the devices 30-37 or with access point 21, which includes WLAN RF interface 39 and piconet RF interface 38. As such, wireless headset 10 may function as the headset for wire line telephone 37, Ethernet telephone 35, personal digital assistant 30, personal computer 32, laptop computer 34 and/or cellular telephone 36 provided a piconet and registration can be established with the device. In accordance with the present invention, if a piconet cannot be established with the particular device, an extended network may be created utilizing the WLAN connectivity and at least one corresponding piconet.

If voice communications are to be serviced via wire line telephone 37 (i.e., the base unit for this example), but headset 10 is at a distance such that a piconet cannot be established between their piconet RF interfaces, and headset 10 is in a range to establish a piconet with cellular telephone 36, the piconet RF interfaces of cellular telephone 36 and headset 10, respectively, would establish a piconet, which may be established in accordance with the Bluetooth specification. With this piconet established, cellular telephone 36, via its WLAN RF interface, establishes a wireless connection with access point 21. Access point 21 then establishes a communication link with wire line telephone 37. Thus, a logical connection is established between headset 10 and wire line telephone 37 via cellular telephone 36 and access point 21. Note that wire line telephone 37 may be directly coupled to LAN 50 or coupled to a private branch exchange (PBX), which in turn is coupled to access point 21. Accordingly, within a wireless geographic area, the range of headset 10 may be extended utilizing the WLAN within the geographic area. As such, headset 10 extends the mobility of its user, extends the range of headset use and expands on headset functionality while preserving privacy and security by seeking service from base units to which it may be registered. Alternatively, headset 10 may establish a piconet with cell phone 36. This allows cell phone 36 to establish an alternate communication pathway for the communications serviced by wired telephone 37. Then it is possible for the call serviced by telephone 37 or 35 to be "handed off" to cellular telephone 36.

Figure 4:
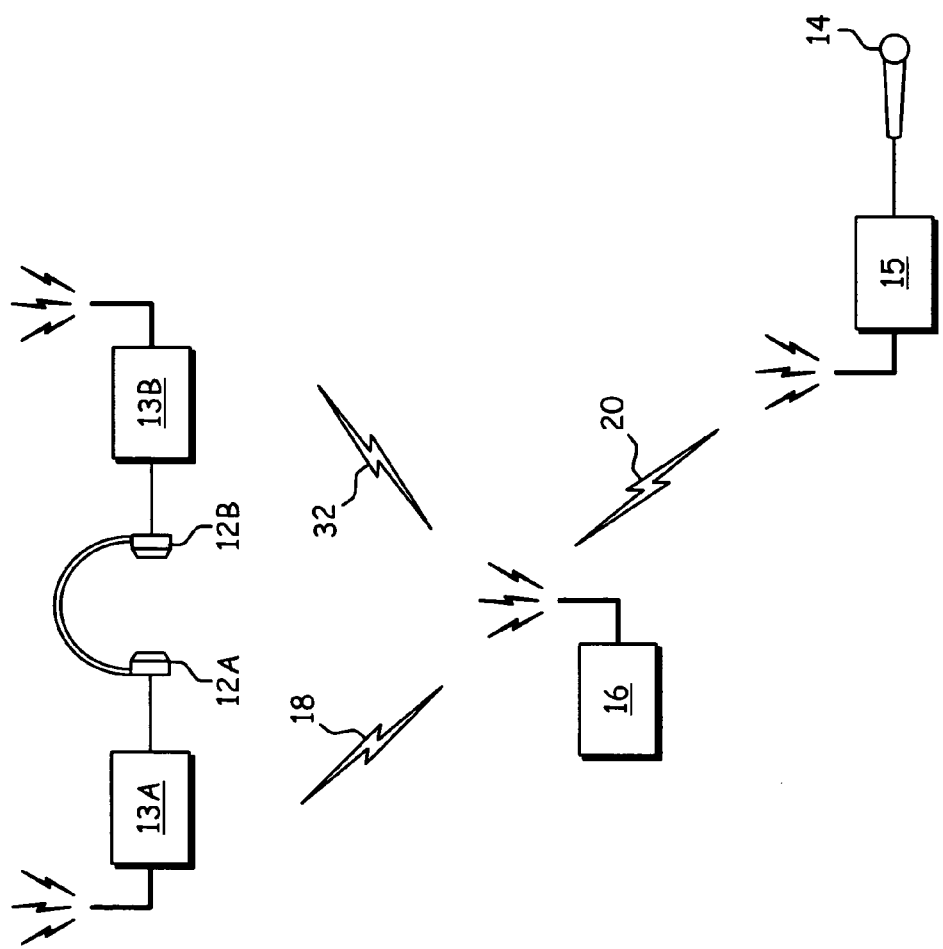
FIG. 4 is a block diagram of a multi-channel wireless headset in accordance with one embodiment of the present invention.

FIG. 4 is a diagram of another embodiment of a modular wireless headset 10 that includes two earpieces 12A and 12B, microphone 14, and user interface 22. In this configuration, microphone 14 communicates with base unit 16 via communication pathway 20, earpiece 12A communicates with base unit 16 using transceiver (or receiver) 13A via communication pathway 18 and earpiece 12B communicates with base unit 16 using transceiver (or receiver) 13B via communication pathway 32. Alternatively, earpieces 12A and 12B, and microphone 14 may establish a piconet and communicate with base unit 16 via a single communication pathway.

Figure 7:
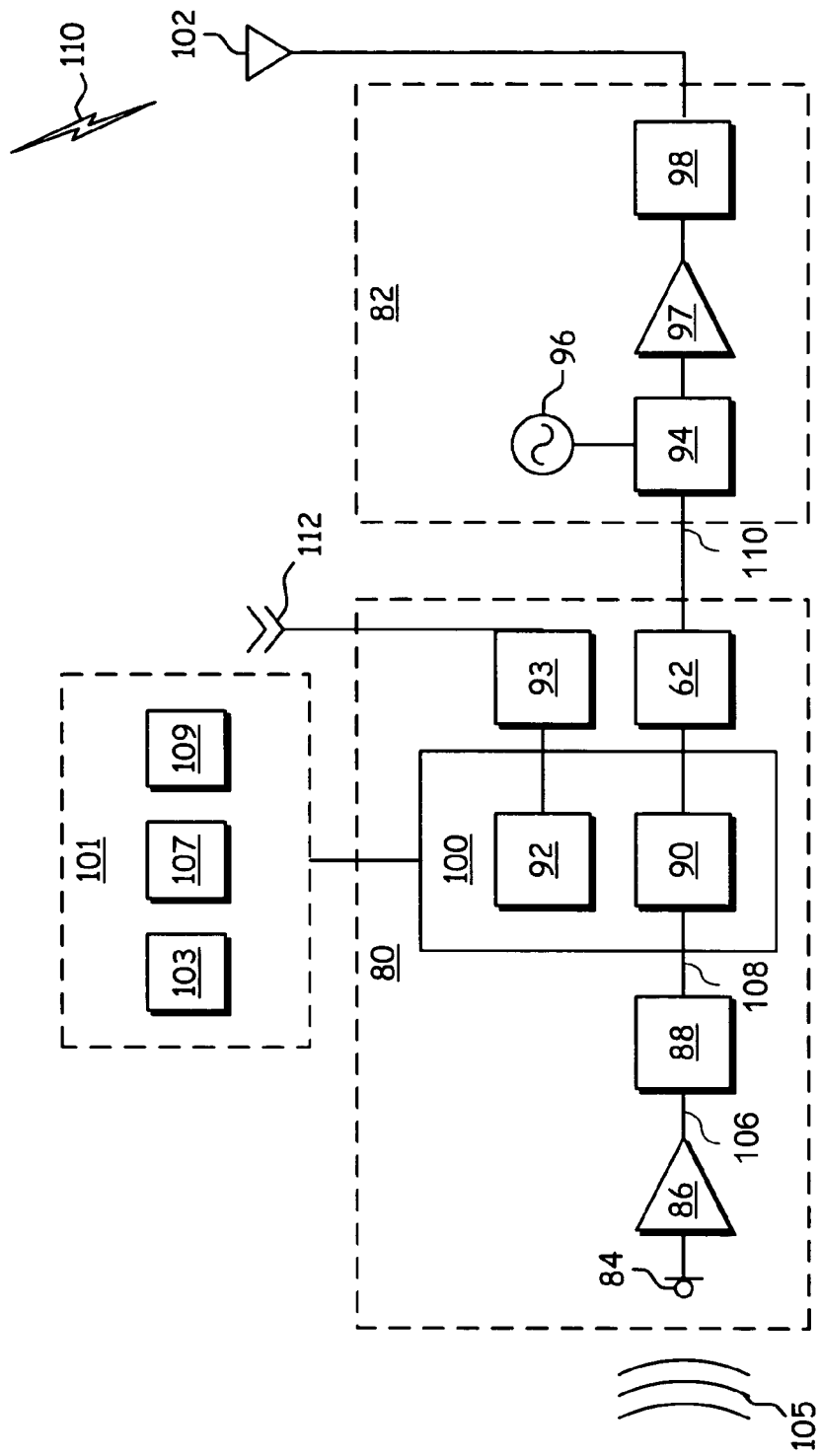
FIG. 7 is a functional block diagram of a wireless microphone in accordance with one embodiment of the present invention.

In operation, voice produced by the individual using microphone 14 is received via a microphone transducer and converted into RF signals by circuitry within microphone 14, as shown in FIG. 7. These RF signals are provided to base unit 16 via the previously identified communication pathways. Base unit 16 includes a corresponding receiver antenna 46 and receiver module to recapture the audio signals received via communication pathways 18, 20 and 32. In addition, base unit 16 includes at least one transmitter to transmit audio information to the earpiece(s) 12A and 12B. In one embodiment, base unit 16 may transmit left channel stereo information to earpiece 12A and right channel stereo information to earpiece 12B.

Wireless headphone(s) may be realized by omitting microphone 14 and including either one or both of earpieces 12A and 12B. In this embodiment, base unit 16 may be a playback device such as a CD player, DVD player, cassette player, etc. operable to stream audio information. If the display of FIG. 2 is utilized as well, both streaming audio and video may be enjoyed by the user.

Figure 5:
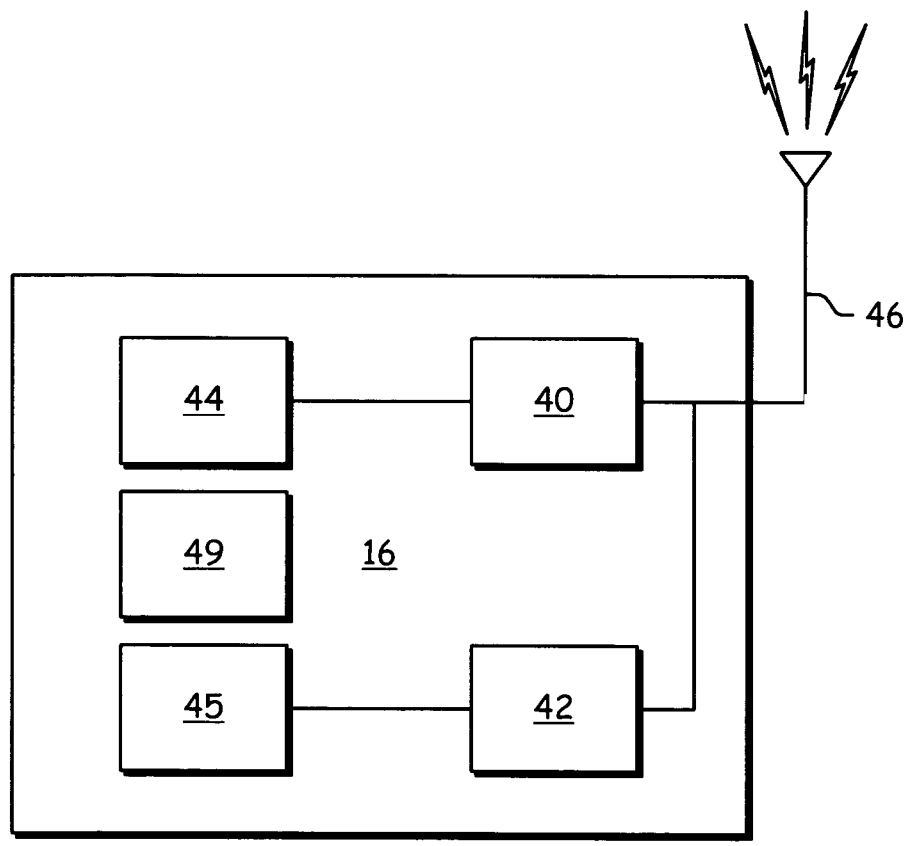
FIG. 5 is a schematic block diagram of an access point in accordance with one embodiment of the present invention.

FIG. 5 is a diagram of a base unit that supports modular wireless multimedia devices. Base unit 16 includes a combination of transmitter and receiver (or transceiver) modules that accept and modulate or demodulate streamed audio, video, text, or data to and from earpiece(s) 12 and microphone 14, display 17 and whiteboard 19 through antenna 46. The base unit may be incorporated within or operably couple to another device such as a playback device, laptop, cellular telephone, land based telephone or other like device known to those skilled in the art. For example, one embodiment has transmitter module 40 and receiver module 42.

Base unit 16 also includes registration circuit 49 with which to compare registration information contained in memory available to base unit 16 and registration information received from headset 10. Registration may occur by physically coupling or docking headset 10 to the base unit or may occur wirelessly. Registration allows a trusted relationship to be established between base unit 16 and headset 10. This relationship ensures privacy and security of communication service by the wireless connection between base unit 16 and headset 10. This trusted relationship utilizes a pass key or other like means of verification to ensure that base unit 16 and headset 10 have permission to access one another. Once the trusted relationship is established through registration, the re-initialization of that relationship is not necessary in order to service communications between base unit 16 and headset 10. The registration information to be exchanged and compared may include voice patterns, biometric information, user tactile inputs in response to stimuli, password, voice recognized input, audio or video tests, encryption keys, handwriting recognition inputs, third party verification and testing, proximity information or other like information known to those skilled in the art. This same set of information may also be used in the previously identified paring process.

Transmitter module 40 accepts voice communications or unmodulated streamed audio, video, data or text from a servicing network or playback device 44 (e.g., DVD player, MP3 player, CD player, cassette player, or other like devices known to those skilled in the art). Playback device 44 may be integrated within base unit 16. Transmitter module 40 then modulates the streamed audio into low intermediate frequency (IF) signal. In the case where two earpieces are employed, multiple transmitter modules or time separation may be employed to modulate the streamed audio into low IF signals for the earpieces for each channel (i.e. left and right channels of stereo transmissions. These multiple signals are synchronized in their presentation to a user. Similarly, receiver module 42 accepts modulated streamed audio, video, data or text from multimedia device 10. Receiver module 42 recovers signals from the received low IF signals. The recovered signals are then relayed to the servicing network or presentation device 45. Note that the generation of low IF signals and subsequent demodulation to recapture audio signal may be done in accordance with a particular wireless communication standard. For example, the Bluetooth specification may be used, IEEE802.11(a), (b), and/or (g) may also be used, etc. when base unit 16 couples to a telephone network (PSTN, cellular, satellite, WLAN, VOIP, etc.). Base unit 16 may receive data associated with the command as well. For example, caller ID information may be passed to user interface 22 or enhanced call operations may be initiated based on input received at the user interface.

Figure 6:
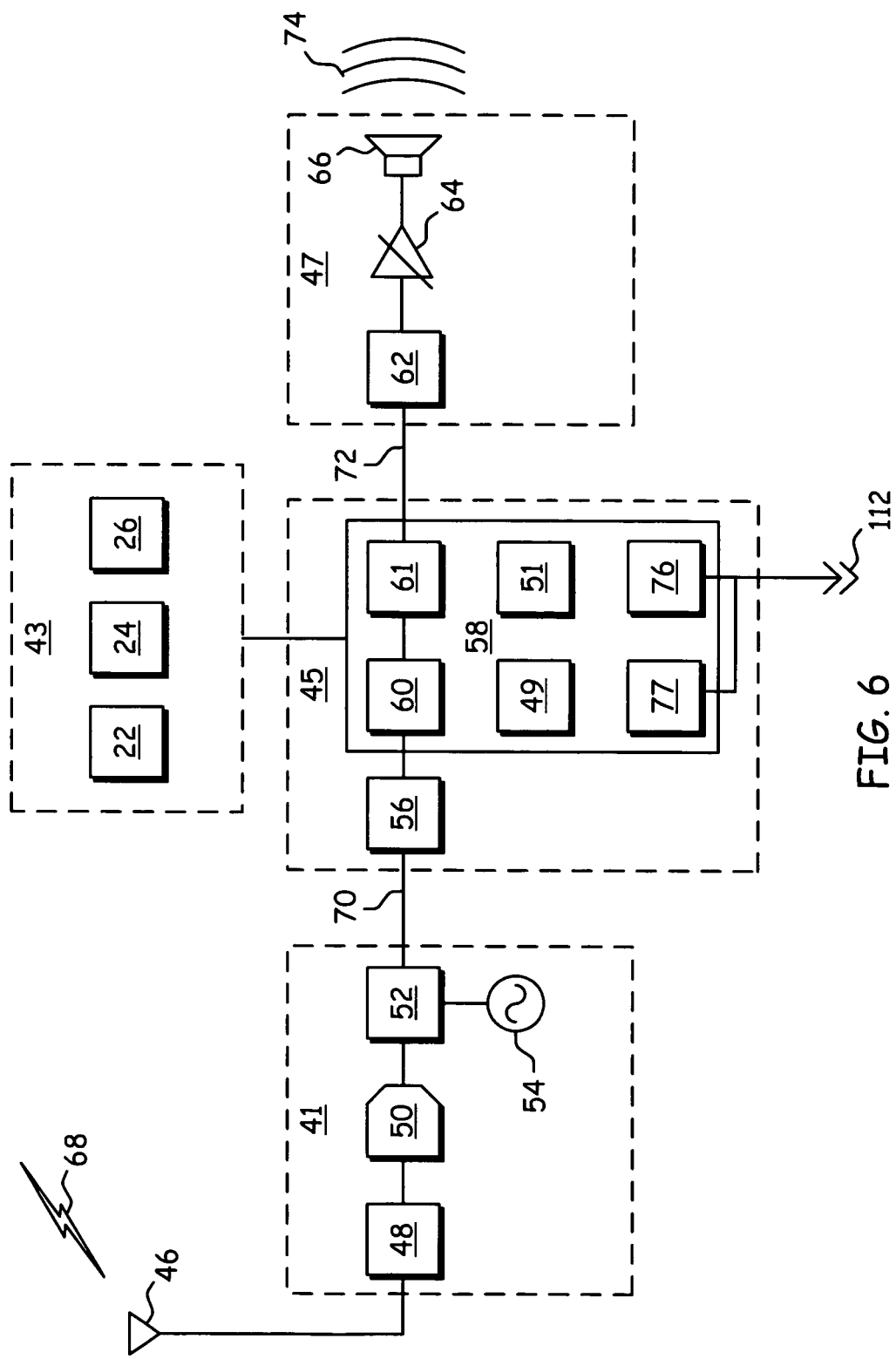
FIG. 6 is a functional block diagram of wireless earpiece in accordance with one embodiment of the present invention.

FIG. 6 is a schematic block diagram of earpiece 12. Earpiece 12 includes receiver module 41, optional user interface 43, processing module 45 and speaker module 47. Receiver module 40 includes antenna 46, bandpass filter 48, low noise amplifier 50, down converter 52 and local oscillator 54. User interface 43 can be any combinations of a visual interface as evidenced by display 22, tactile interface as evidenced by buttons 26, and/or an audio interface represented by microphone/speaker and may operably couple to processing module 58 to initiate call functions or playback functions which will be described further in FIG. 10.

Processing module 45 performs data recovery and includes an analog-to-digital converter (ADC) 56. The processing module also includes pairing circuit 49 and registration circuit 51. Digital channel filter 60 and demodulator 61 process the recovered signal while setup module 76, pairing circuit 49 and registration circuit 51 act to establish secure, private communications path with trusted devices and the base units. Speaker module 47 includes a digital-to-analog converter (DAC) 62, variable gain module 64, and at least one speaker 66 to render recovered communications.

Once the piconet is configured and trusted relationships are established, receiver module 41 receives inbound RF signal 68 from base unit 16 via antenna 46. Bandpass filter 48 filters the received RF signal 68 which are subsequently amplified by low noise amplifier 50. Down converter 52 converts the filtered and amplified RF signal 68 into low intermediate frequency (IF) signal 70 based on a local oscillator 54. Low IF signals 70 may have a carrier frequency at DC ranging to a few megahertz.

Processing module 45 receives low IF signals 70 and converts the low IF signals 70 into digital signals via ADC 56. Processing module 45 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory (not shown) may be a single memory device or a plurality of memory devices. Such a memory device may be a read-only memory, random access memory, volatile memory, non-volatile memory, static memory, dynamic memory, flash memory, and/or any device that stores digital information. Note that when processing module 58 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Digital channel filter 60 receives the digital low IF signals 72 and filters these signals. Demodulator 61 recovers audio signals 74 from the filtered low IF signals. Note that the generation of RF signal 68 and subsequent demodulation to recapture audio signal 74 may be done in accordance with a particular wireless communication standard. For example, the Bluetooth specification may be used; IEEE802.11 (a), (b), and/or (g) may also be used, etc.

Speaker module 47 converts digital audio signal 72 into analog signals rendered to the user through speakers 66. Adjustable gain module 64 adjusts the gain (i.e., adjusts volume), and provides the amplified signals to speaker 66, which produces audible signals 74. As long as the piconet remains in place between earpiece 12 and base unit 16, earpiece 12 will produce audible signals 74 from received inbound RF signal 68.

FIG. 7 is a schematic block diagram of microphone 14 that includes audio input module 80, transmitter module 82 and user interface 101. Audio input module 80 includes microphone 84, amplifier 86, ADC 88, processing module 100 that includes a setup module 92 and modulator 90, and DAC 62. Setup module 92 further includes a pairing circuit and an optional registration circuit to establish secure, private communications as previously described. User interface 101 can be any combinations of a visual interface as evidenced by display 103, tactile interface as evidenced by buttons 107, and/or an audio interface represented by microphone/speaker 109 and may operably couple to processing module 100 to initiate call functions which will be described further in FIG. 10. Transmitter module 82 includes up-converter 94, local oscillator 96, power amplifier 97, bandpass filter 98, and antenna 102.

Once microphone 14 is configured within a piconet, microphone 84 to receives audio signals 105 and converts these signals to analog signals 106. Amplifier 86 amplifies analog audio signals 106 that ADC 88 then converts into digital audio signals 108. Modulator 90 modulates the digital signals based on a predetermined communication standard. As shown, modulator 90 and setup module 92 are implemented within processing module 100. Processing module 100 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Up-converter 94 converts modulated signals 110 into RF signals based on local oscillator 96. Power amplifier 97 amplifies these signals which may be subsequently processed by bandpass filter 98. The filtered RF signals are then transmitted via antenna 102 as outbound RF signals 110 to base unit 16. As long as the piconet is established to include microphone 14 and base unit 16 in a trusted pair, microphone 14 may transmit to base unit 16 in the manner described.

As shown in both FIGS. 6 and 7, separable tether or connector 112 may physically connect setup modules 76 and 92 and/or power distribution modules 77 and 93. Such a physical connection allows for earpiece 12 and microphone 14 to share resources, such as battery life, and communicate in both directions with the base unit. Power distribution control and management may be performed by circuitry within power distribution modules coupled to the setup modules or within the modules themselves. This circuitry may perform the functions discussed in FIGS. 12 and 13. Power Circuits 77 and 93 both include a battery or other like, portable power source. Additionally, power circuits 77 and 93 may include a power distribution management or control circuit. This power distribution circuit may direct how resources such as battery life are shared between earpiece 12 and microphone 14. For example, when operating in a receive-only mode, power may be used to maximize operating time of the earpiece by conserving unnecessary power expenditures from the wireless microphone. In another embodiment, a user may select a mode using the display interface and buttons 26 of FIG. 1 to select a microphone-only mode or an earphone-only mode. Additionally, the power distribution modules may examine the operating history associated with the wireless earpiece 12 and microphone 14 to determine a standby time associated with these individual components. Power may be distributed such that the standby times of the components are equal. In another alternative, the module wireless headset couples to an external power support source available through a base unit.

In such a case, the wireless earpiece or wireless microphones' internal reserves may be preferentially charged over one another. This decision, again, may be based on user input, operating history, maximizing standby time, or quite simply whichever power supply has lower reserves.

With respect to communication, if the devices are compliant with one or more versions of the Bluetooth Specification base unit 16, functioning as the master, may issue a registration request to earpiece 12 coupled to microphone 14. Upon receiving this request, earpiece 12 and microphone 14 respond to the request indicating that RF channel(s) be established for the headset. Based on these responses, the master coordinates the establishment of the pathways and provides synchronization information through earpiece 12 and microphone 14 via receiver module 40 of earpiece 12. Setup modules 76 and 92 coordinate the registration of earpiece 12 and microphone 14 with the base unit, pairing of earpiece 12 and microphone 14, as well as coordinating timeslot assignments and/or SCO link assignments. Once the physical connection between earpiece 12 and microphone may be severed to establish earpiece 12 and microphone 14 as separate pieces. Alternatively, earpiece 12 and microphone 14 may each directly couple to the base unit to accomplish this setup.

Figure 8:
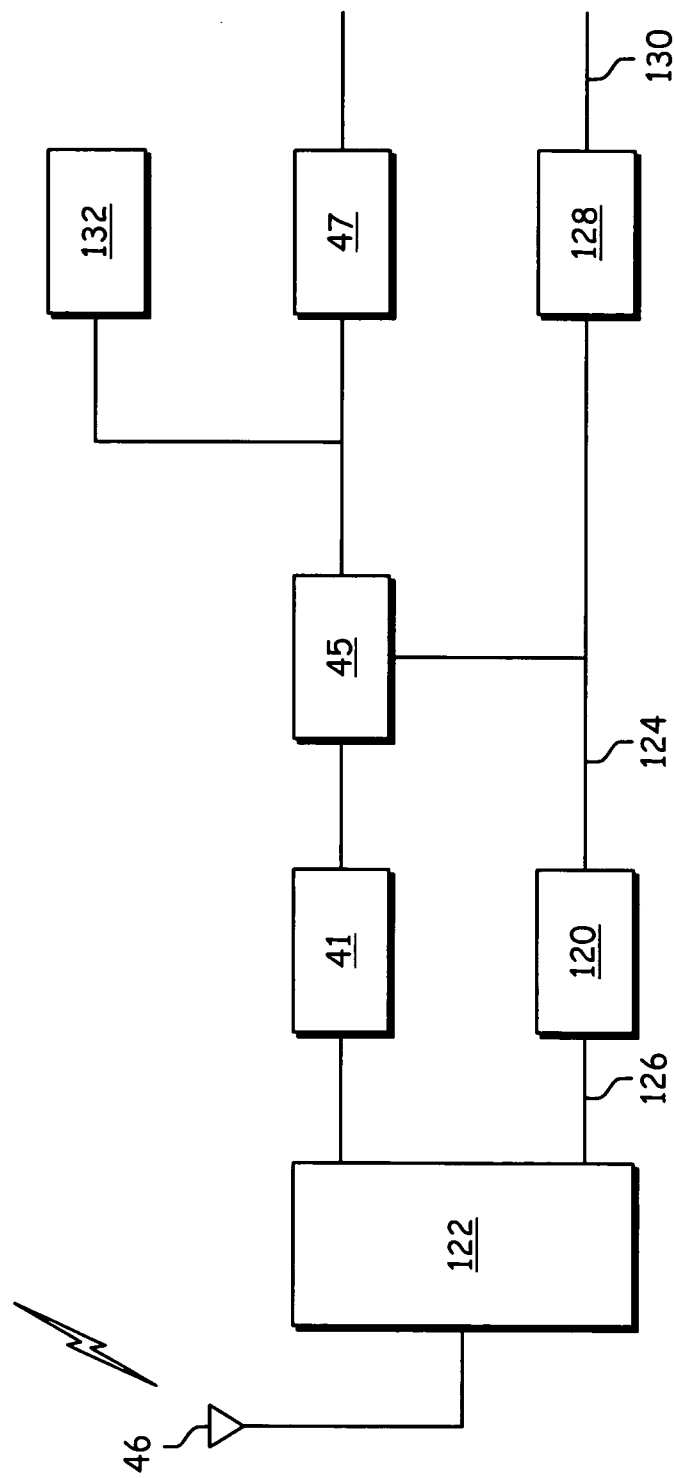
FIG. 8 is a schematic block diagram of a wireless microphone in accordance with the present invention.
Figure 9:
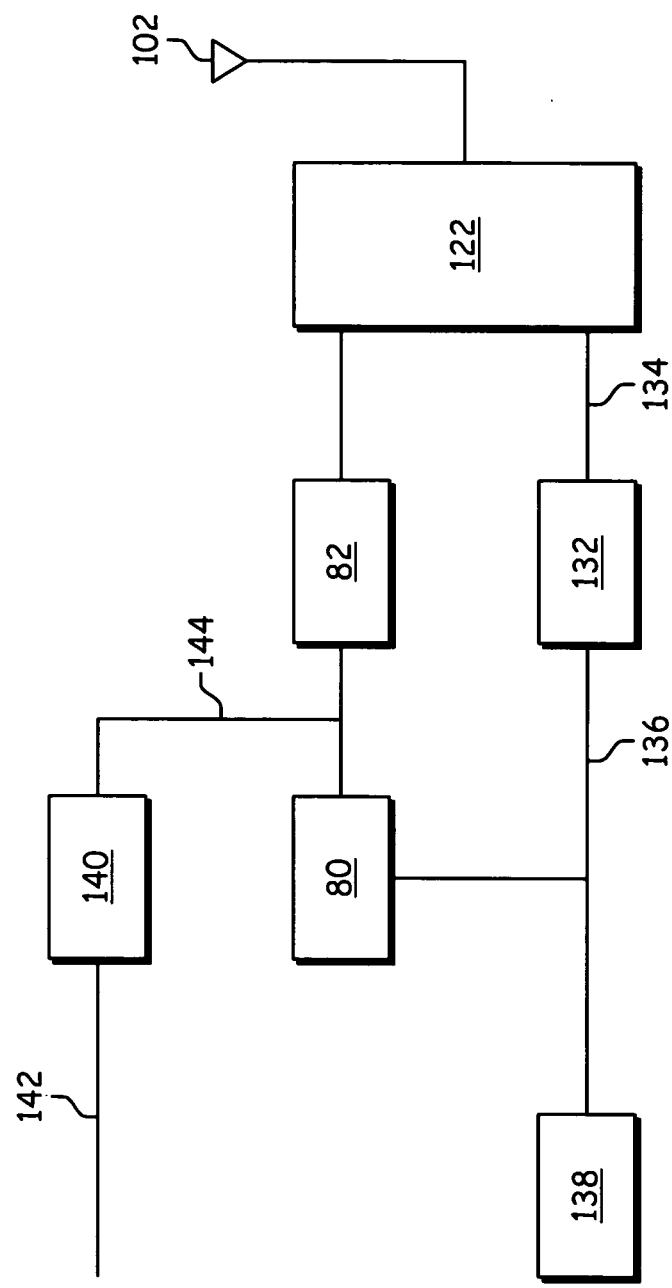
FIG. 9 is a schematic block diagram of a wireless microphone in accordance with the present invention.

FIGS. 8 and 9 illustrate schematic block diagrams of earpiece 12 and microphone 14 that include transceiver modules (i.e., receiver modules and transmitter modules). The use of the transceiver modules allow earpiece 12, microphone 14 and base unit 16 to be physically separate devices and be configured, paired and registered using wireless communications. As such, earpiece 12 and microphone 14 may be continuously worn on a person for receiving incoming calls and/or placing outgoing calls.

Earpiece 12, as shown in FIG. 8, includes antenna 46, transmit/receive switch 122, receiver module 41, processing module 45, speaker module 47, transmitter module 120, input module 128 and display module 132. Receiver module 41, processing module 45 and speaker module 47 operate as discussed with reference to FIG. 6. Processing module 45 may also produce display information for display module 132. For instance, the received RF signal may include information such as caller ID, command information, etc. which is separated by processing module 45 and provided to display module 132, which may be an LCD display, plasma display, etc.

Input module 128, which may be a keypad, touch screen, voice recognition circuit, or other like user interfaces, receives user commands and produces digital command messages 124 there from. Such digital command messages 124 includes, but are not limited to, packet size, synchronization information, frequency hopping initiation information, timeslot allocation information, link establishment information, piconet address information, fast-forward, play, pause, volume adjust, record, stop and rewind.

Processing module 45 receives digital command messages 124 and, when applicable, processes the command messages. For example, if the command message is with respect to a volume adjust; a graphical representation of adjusting the volume may be presented on display module 132 and the gain of amplifier 64 adjusted to adjust the volume associated with speaker 66. This command may also initiate pairing and registration.

Transmit module 120 receives digital command messages 124 and converts these messages into outbound RF command signals 126, which are subsequently transmitted to base unit 16 and/or microphone module via antenna 46. Accordingly, by including transmitter module 120 along with receiver module 41, earpiece 12 may function as a master and/or slave and exchange/relay data for other components.

FIG. 9 is a schematic block diagram of microphone 14 that includes audio input module 80, transmitter module 82, transmit receive switch 122, antenna 102, receiver module 132, input module 140 and display module 138. Input module 140 is operable to receive user input commands 142 and convert these commands into digital command messages 144. Input module 140 couples to or includes a user interface that allows a user to initiate call functions or network hardware operations, such as pairing and registration. Network interface functions may include base unit interface functions, component interface functions, directory functions, caller ID functions, voice activated commands and device programming functions. This user interface can be any combinations of visual interface(s), tactile interface(s), and/or an audio interface(s) that allow the user to input commands 142. Digital command messages 144 may be similar to digital command messages 124 and may further include establish a call, terminate a call, call waiting, or other like functions. Transmitter module 82 converts digital command messages 144 into RF command signals 134 that are transmitted via antenna 102. Similarly, inbound RF command signals 135 may be received by receiver module 132 via antenna 102. Display module 138, which may be a LCD display, plasma display, etc., receives digital command messages 136 and may display corresponding configuration messages. In addition, any display information received from the host and/or microphone module regarding setup, operation, or as part of the data content, may be displayed on display module 138.

Figure 10:
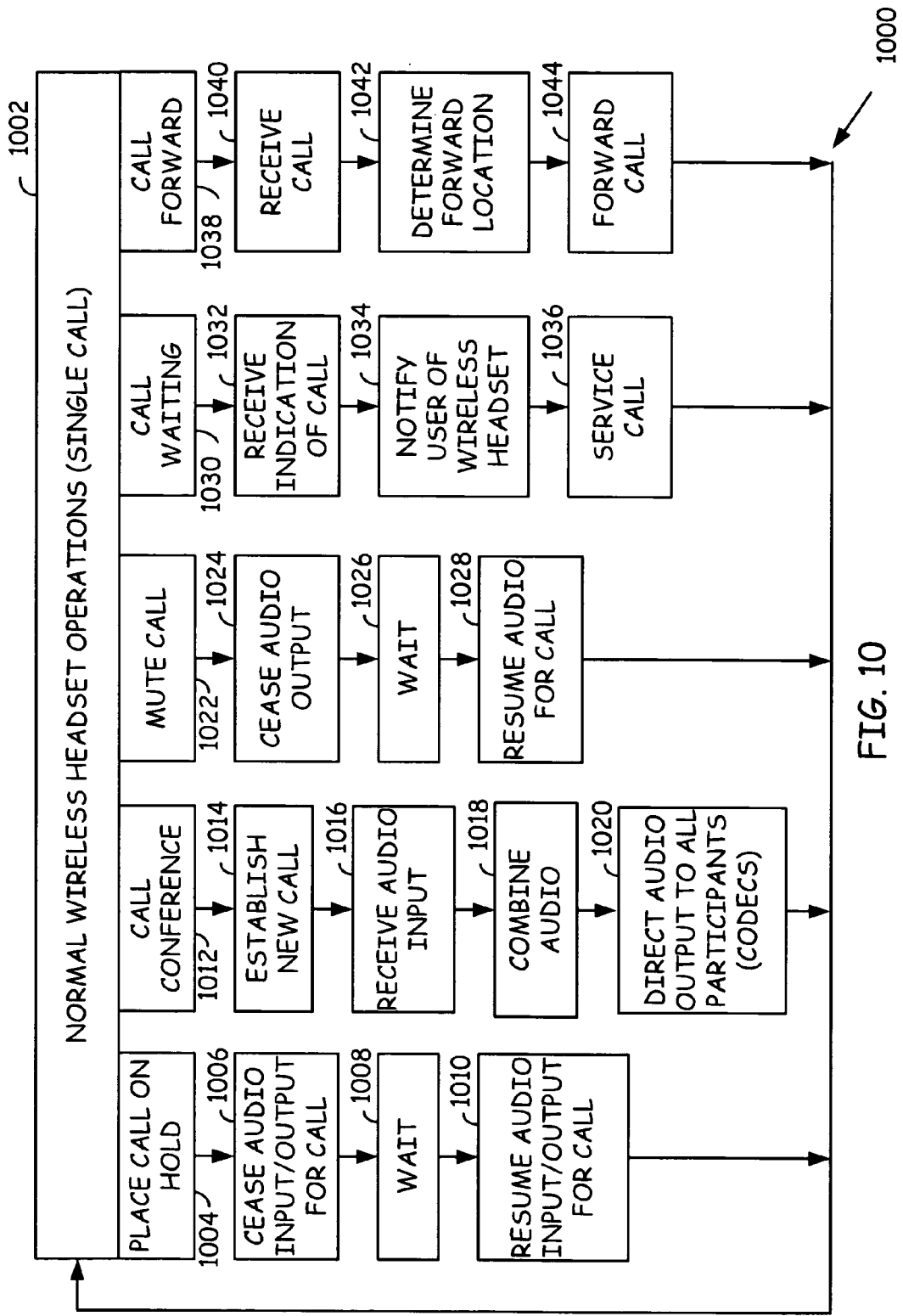
FIG. 10 is a logic diagram illustrating operation of a wireless headset in performing call management.

FIG. 10 is a logic diagram illustrating operation of a wireless headset constructed according to the present invention in serving voice communications while providing call management. The operations described with reference to FIG. 10 may be performed whole or in part by an on-chip processor within or coupled to processing modules 58 and 100 of FIGS. 6 and 7. During normal operations, the wireless headset services normal operations, e.g., single call or device playback. Other modular devices, such as those of FIG. 2 that couple to the microphone or headset, may perform these operations.

One particular operation that the wireless headset may perform is to place a call on hold (step 1004). In such case, the wireless headset ceases producing audio input and audio output for the call (step 1006). These operations are continued during a wait state (step 1008) until normal operations are resumed for the call (step 1010). From step 1010, operation proceeds to step 1002. The call hold operations of steps 1004-1010 may be performed in conjunction with the other operations of FIG. 10, e.g., call waiting, call muting, call conferencing, etc.

Call conferencing (step 1012) may be initiated by the wireless headset or by a master device if the wireless headset does not have sufficient user interface for call conferencing initiation. In such case, a new call is established by the wireless headset (step 1014). This new call may be serviced by the additional channels serviced by the wireless headset. As was previously described, the wireless headset supports multiple channels. Using this multiple channels, the wireless headset receives audio input from all participants (step 1016) and combines the audio input, along with the input generated by the user of the wireless headset. The wireless headset then directs the combined audio to all participants (their servicing CODECs at step 1020). Note that these operations are continually performed for the duration of the conference call.

The wireless headset may also mute calls (step 1022). In such case, the wireless headset simply ceases all audio output (1024) and waits for the user of the wireless headset to cease the muting operations (step 1026). When the muting has been ceased, the wireless headset resumes the audio servicing of the call (step 1028).

The wireless multimedia device also performs call waiting operations (step 1030). In such case, the wireless multimedia device receives an indication that a call is inbound (step 1032). However, instead of immediately servicing the call, the wireless multimedia device notifies the user of the wireless multimedia device of the call (step 1034), e.g., provides a beeping indication to the user of the wireless multimedia device. The wireless multimedia device then services the call (step 1036), at the direction of the user to either complete the call, have the call join a currently serviced call (via call conferencing operations in some cases), or to ignore the call.

The wireless multimedia device may also perform call forwarding operations according to the present invention (step 1038). In such case, the wireless multimedia device receives the call (step 1040). However, instead of servicing the call, the wireless multimedia device determines a forwarding location for the call (step 1042) and then forwards the call (step 1044). Operation from steps 1010, 1020, 1028, 1036, and 1044 return to step 1002.

Figure 11:
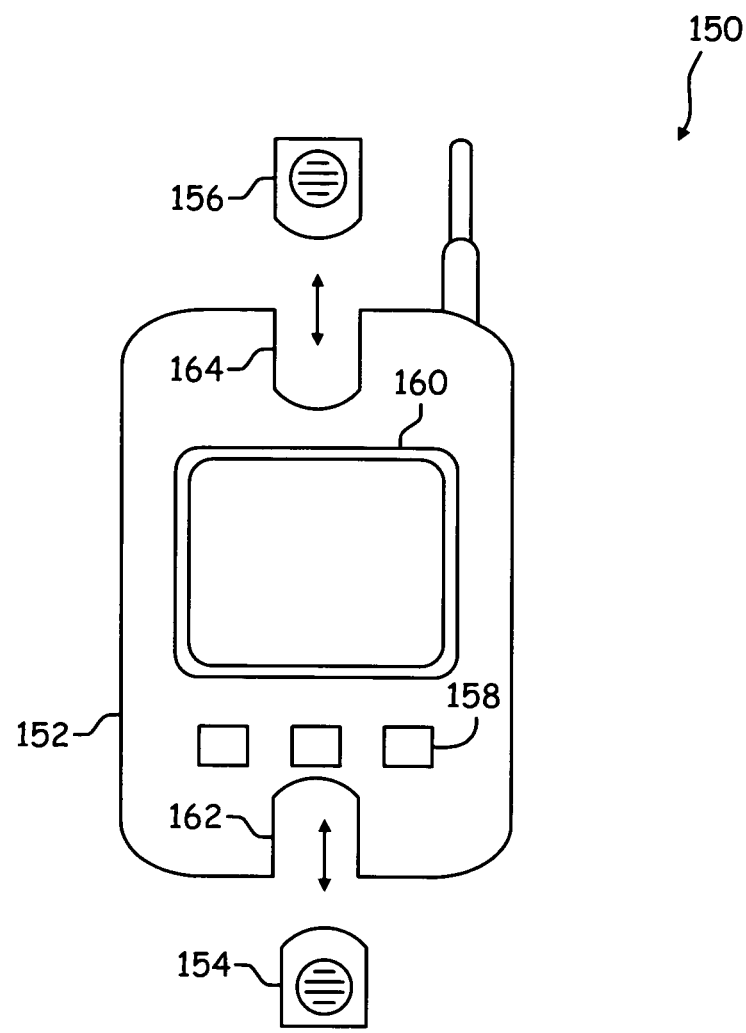
FIG. 11 is a diagram of a modular communication device in accordance with an embodiment of the present invention.

FIG. 11 is a schematic block diagram of modular communication device 150, such as a wireless terminal (e.g., cell phone or wireless packet data phone) that includes host device (base unit) 152, detachable microphone 154 and detachable earpiece 156. Detachable earpiece 156 and microphone 154 may couple through receptacles that allow communication over a wired connection and the sharing of resources such as battery life. In this embodiment, modular communication device 150 may function as a typical device (e.g., cellular telephone, CD player, cassette player, etc.) when detachable earpiece 156 and detachable microphone 154 are physically connected to host device 152. When detachable earpiece 156 is not in physical contact with host device 152, a wireless connection couples detachable earpiece 156 and host device 152. Similarly, when detachable microphone 154 is detached from host device 152, a second wireless connection couples detachable microphone 154 and host device 152. Alternatively, when detachable earpiece 156 and/or detachable microphone 154 are physically coupled to host device 152, they may communicate via a physical or wireless link. At this time, they may be paired and registered as well to the host device. As one of average skill in the art will appreciate, modular communication device 150 may include multiple detachable earpieces 156. In addition, modular communication device 150 may omit detachable microphone 154 if host device 152 is a playback type device (e.g., DVD player, CD player, cassette player, etc.). Similarly, modular communication device 150 may omit detachable earpiece 156 when functioning as a recording device (e.g., dictaphone). Detachable earpiece 156 and microphone 154 may have on-chip operations to support call conferencing, call waiting, flash, and other features associated with telephones. These functions may be accessed and reviewed by a user interface 158 and display 160 within host device 152 or a user interface and display located on either detachable earpiece 156 or microphone 154. The user interface and display, located on either the host device or detachable earpiece 156 and microphone 154 may have a display and button(s) that may be used to program device, perform directory functions including selecting number to call, view caller ID, initiate call waiting, or initiate call conferencing. Additionally, circuitry within the earpiece 156 and microphone 154 may enable voice activated dialing. The actual voice recognition could be performed within earpiece 156, microphone 154, or host device 152. Thus, earpiece 156 and microphone 154 may act to initiate calls and receive calls.

Physically coupling the base unit to earpiece 156 and microphone 154, allows base unit 152, earpiece 156 and microphone 154 to share resources, such as battery life, and allow earpiece 156 and microphone 154 to be recharged from host device 152. Earpiece/microphone/base portion are included with cell phone battery. Cell phone battery has openings 162 and 164 located therein for storage/recharging of earpiece 156 and microphone 154. When located in these openings, the earpiece/microphone will be recharged from the cell phone battery. The new cell phone battery may include base portion RF interface and interface to cell phone port. Existing cell phone port technology could be used to treat the earpiece/microphone in the same manner as wired earpiece/microphone is treated.

Base unit 152 may be a modular playback device, that includes host device (base unit) 152, detachable microphone 154 and detachable earpiece 156. Base unit 152 may also serve as an external power supply that directly couples or tethers to the wireless components. This external portable power supply may include receptacles 162 and 164 for the both the wireless earpiece and wireless microphone as well as an internal battery (not shown) that can provide power to operate the modular wireless headset or recharge the portable power supplies of the modular wireless headset through the physical coupling. A display/interface 160 may allow user commands to be received and directed to the modular wireless headset and display information from the modular wireless headset as well as the portable power supply to the user. The external power supply may physically couple directly to the modular wireless headset or may couple through tether 155 via an adapter. This adapter may take the form of a universal serial bus (USB) connector that allows the modular wireless headset to be recharged from laptops, personal computers, or other devices having USB or like connectors.

Figure 12:
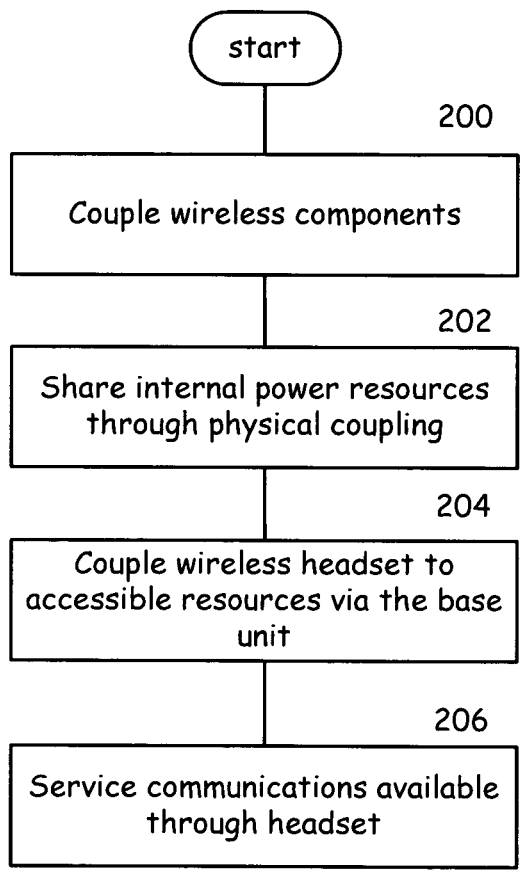
FIG. 12 is a logic diagram of a method for servicing voice communication with a wireless headset in accordance with one embodiment of the present invention.

FIG. 12 is a logical diagram that illustrates another method of servicing voice communications between a destination terminal and modular wireless headset in accordance with the present invention. Step 200 couples the wireless microphone and wireless earpiece that form the modular wireless headset with a tether or direct physical connection. Additionally, the modular wireless headset may physically couple to a base unit in order to share resources, exchange information and exchange registration information. This coupling may involve physically docking the wireless microphone and wireless earpiece to the base unit to share power supplies, or establishing wired or wireless communications between the wireless microphone, wireless earpiece and the base unit. In Step 202, the internal power resources are shared through a physically coupling with a tether or direct connection. Step 204 provides access to the components of the wireless headset to resources made available through the base unit. This allows the service of communications or the playback of stored or streamed media between resources made available through the base unit and the headset in Step 206. For example, voice communications may be serviced between a destination terminal and the headset.

Figure 13:
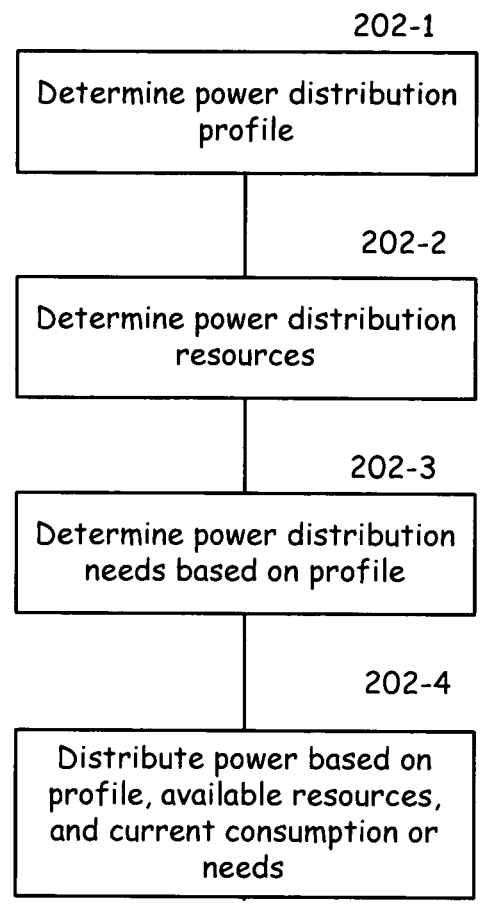
FIG. 13 is a logic diagram of a method for sharing power resources within a wireless headset in accordance with one embodiment of the present invention.

FIG. 13 is a logic diagram of a method for extending the battery life of components within a modular wireless headset. FIG. 13 provides more detail on how internal power resources are shared as previously described in Step 202. This involves first determining a power distribution profile in Step 202-1. This profile may be based on a user selected mode of operation, a historical use profile, or other criteria known to those having skill in the arts. Next in Step 202-2 the system will determine the power distribution resources. This involves determining the internal power reserves associated with the batteries located in the wireless microphone, wireless earpiece, base unit, and whether an external power supply is attached through a connector or the base unit. Step 202-3 determines the power distribution needs based on the profile. For example when the modular wireless headset is operated in a one way receive only mode, it may not be necessary to operate the wireless microphone. Hence only the wireless earphones need be powered. Step 202-4 distributes the power based on the profile, available resources and current consumption or needs. Thus power may be distributed to operate the wireless earphone and wireless microphone and/or recharge internal power supplies within those wireless components. In an example where the wireless earphone's battery is depleted and the wireless microphone's is fully charged, the power distribution may partially or fully charge the wireless earpiece's battery from that of the attached resources. These resources may include the fully charged battery within the wireless microphones and the coupled base unit which may be operating from an internal power supply or an external power supply.

In summary, the present invention provides a modular wireless headset to support voice communications when registered to a base unit. The present invention provides a modular wireless headset having integrated but detachable elements for use within a cellular wireless terminal, streamed media or playback device. This modular wireless headset may include a wireless microphone and a wireless earpiece. The wireless earpiece may physically couple to the wireless microphone and a base unit in order to exchange information and share power resources. The wireless earpiece may further include a wireless interface that communicatively couples the wireless earpiece, wireless microphone, and base unit. A processing circuit recovers voice communications wirelessly communicated from the base unit, which are then rendered by a speaker. A user display/interface communicatively coupled to the processing circuit may receive user commands as well as display information to the user. A portable power supply such as a battery within the wireless earpiece may power the earpiece and microphone. A power distribution controller allocates power between the wireless earpiece, wireless microphone, and base unit when physically coupled to operate or charge internal power supplies of the components. An authentication circuit may establish a trusted pair relationship between the wireless earpiece, wireless microphone, and base unit prior to enabling wireless communications between these components.

This method of power distribution within a modular wireless headset provides many advantages. Since the base unit may distribute power from an external source such as a wall charger, only a single charging device is required. This reduces the number of chargers required by travelers. Additionally, since the base unit may distribute power to operate or charge the modular wireless components, the size and weight of the batteries within the headset can be reduced. The headset's internal battery can be charged from the base unit when attached or docked. This allows the battery life of the headset's internal batteries to be less than that of a stand-alone headset unit. This allows the modular wireless headset to be smaller and lighter than existing stand-alone headset units. This improves portability, wearability, and integration with other devices. Furthermore, the power distribution circuitry can be within any of the components. However, when placed in the base unit, the circuitry within the wireless headset can be potentially simplified or reduced to again improve the portability and wearability of the headset.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a modular communication device, modular wireless multimedia device and modular wireless headphones. By physically separating the microphone from the earpiece and/or by separating the earpieces, more discrete components may be produced that are more comfortable to wear and are less cumbersome to use. As one of average skill in the art will appreciate, other embodiments may be derived from the teaching of the present invention without deviating from the scope of the claims.

What is claimed is:

1. A modular wireless headset operable to support voice communications, comprising:
   a wireless microphone operable to detachably couple to a base unit and coupled to receive first audible signals from a user and provide the first audible signals to the base unit;
   a wireless earpiece operable to physically directly and detachably couple to the wireless microphone and the base unit and coupled to receive second audible signals from the base unit and provide the second audible signals to the user, the wireless earpiece and the wireless microphone each operable to separately detach from the base unit each of the wireless microphone and the wireless earpiece further including a portable power supply; and
   a power control circuit operable to select a charging power supply from the portable power supplies of the wireless earpiece and the wireless microphone based on a current charge of the portable power supplies, the charging power supply recharging the other portable power supply when the wireless earpiece and the wireless microphone are physically coupled.

2. The modular wireless headset of claim 1, wherein the base unit comprises the power control circuit operable to allocate power between the wireless earpiece and the wireless microphone when the wireless earpiece and the wireless microphone are physically coupled to the base unit.

3. The modular wireless headset of claim 2, wherein the power control circuit is operable to allocate power between the portable power supplies of the base unit, wireless earpiece and wireless microphone based on a mode of operation of the modular wireless headset.

4. The modular wireless headset of claim 2, wherein the power control circuit is operable to allocate power to and from the portable power supplies of the base unit, wireless earpiece and wireless microphone based on a user input.

5. The modular wireless headset of claim 2, wherein the power control circuit is operable to allocate power to and from the portable power supplies of the base unit, wireless earpiece and wireless microphone based on historical use of the modular wireless headset.

6. The modular wireless headset of claim 2, wherein the base unit base unit comprises a playback device.

7. The modular wireless headset of claim 2, wherein the base unit base unit comprises a wireless terminal operable to communicatively couple the wireless headset to a servicing network, and wherein the servicing network is selected from the group consisting of:
   cellular network;
   public switched telephone network (PSTN);
   wide area network (WAN);
   local area network (LAN); and
   a wireless local area network (WLAN).

8. The modular wireless headset of claim 1, wherein the base unit further comprises:
   a wireless earpiece receptacle operable to receive the wireless earpiece;
   a wireless microphone receptacle operable to receive the wireless microphone;
   a battery operable to provide power to operate the modular wireless headset or recharge portable power supplies of the modular wireless headset through the physical coupling; and
   a display/interface operable to receive user commands directed to the modular wireless headset and display information received from the modular wireless headset.

9. The modular wireless headset of claim 1, wherein the wireless earpiece, wireless microphone and base unit are physically coupled together.

10. A method to service voice communications between a destination terminal and a modular wireless headset, comprising:
   physically directly coupling a wireless microphone and a wireless earpiece of the modular wireless headset to a base unit having receptacles to receive the modular wireless headset, each of the wireless microphone and the wireless earpiece having a portable power supply;
   distributing power between the base unit and the wireless microphone and wireless earpiece through the receptacles by selecting a charging power supply from the portable power supplies of the wireless earpiece and the wireless microphone based on a current charge of the portable power supplies, the charging power supply recharging the other portable power supply;
   separately detaching the wireless microphone from the base unit and the wireless earpiece from the wireless microphone and the base unit;
   communicatively coupling the modular wireless headset to the base unit to enable the wireless microphone to receive first audible signals from a user and provide the first audible signals to the base unit and the wireless earpiece to receive second audible signals from the base unit and provide the second audible signals to the user;
   communicatively coupling the modular wireless headset to a servicing network through the base unit; and servicing voice communications between the modular wireless headset and a destination terminal accessible to the modular wireless headset through the communicatively coupled base unit and servicing network.

11. The method of claim 10, wherein the portable power supplies of the wireless microphone and wireless earpiece are further operable to:
   operate the modular wireless headset;
   recharge from the base unit; and
   recharge the portable power supply having a lesser charge from the portable power supply having a greater charge.

12. The method of claim 10, wherein the base unit comprises a wireless terminal, and wherein the base unit is operable to:
   physically couple to the modular wireless headset; and
   recharge the portable power supplies of modular wireless headset through the physical coupling.

13. The method of claim 12, wherein the wireless microphone and wireless earpiece physically couple to receptacle(s) within the base unit.

14. The method of claim 13, wherein the receptacle(s) are within the base unit's portable power supply.

15. The method of claim 10, wherein the modular wireless headset is operable to physically couple to a portable power supply, and wherein the portable power supply comprises:
   a wireless earpiece receptacle operable to receive the wireless earpiece;
   a wireless microphone receptacle operable to receive the wireless microphone;
   a battery operable to provide power to operate the modular wireless headset or recharge the portable power supplies of the modular wireless headset through the physical coupling; and
   a display/interface operable to receive user commands directed to the modular wireless headset and display information received from the modular wireless headset.

16. The method of claim 15, wherein the base unit comprises the portable power supply.

17. The method of claim 10, further comprising physically coupling the modular wireless headset to an external power supply with an adapter.

18. The method of claim 17, wherein the adapter comprises a universal serial bus (USB) connector operable to physically couple the modular wireless headset to an external power supply via a USB port.

19. The method of claim 10, wherein the servicing network is selected from the group consisting of:
   cellular network;
   public switched telephone network (PSTN);
   wide area network (WAN);
   local area network (LAN); and
   a wireless local area network (WLAN).

20. A modular wireless headset operable to support voice communications, comprising:
   a wireless microphone operable to be received by a first receptacle within a base unit, and further operable to detachably couple to the base unit and coupled to receive first audible signals from a user and provide the first audible signals to the base unit; and
   a wireless earpiece operable to be received by a second receptacle within the base unit, and further operable to physically directly and detachably couple to the wireless microphone and the base unit and coupled to receive second audible signals from the base unit and provide the second audible signals to the user, the wireless earpiece and the wireless microphone each operable to separately detach from the base unit;
   wherein the wireless microphone and the wireless earpiece each further comprise a portable power supply, wherein the wireless earpiece and wireless microphone are operable to physically couple to the base unit, wherein the base unit is operable to select a charging power supply from the portable power supplies of the wireless earpiece and the wireless microphone based on a current charge of the portable power supplies, the charging power supply recharging the other portable power supply through the physical coupling.

21. The modular wireless headset of claim 20, wherein the base unit comprises:
   a wireless earpiece receptacle operable to receive the wireless earpiece;
   a wireless microphone receptacle operable to receive the wireless microphone;
   a battery operable to provide power to operate the modular wireless headset or recharge the portable power supplies of the modular wireless headset through the physical coupling; and
   a display/interface operable to receive user commands directed to the modular wireless headset and display information received from the modular wireless headset.

22. The modular wireless headset of claim 20, further comprising a universal serial bus (USB) connector operable to physically couple the modular wireless headset to an external power supply via a USB port.

23. The modular wireless headset of claim 20, wherein the base unit communicatively couples the modular wireless headset to a servicing network, and wherein the servicing network is selected from the group consisting of:
   cellular network;
   public switched telephone network (PSTN);
   wide area network (WAN);
   local area network (LAN); and
   a wireless local area network (WLAN).

24. The modular wireless headset of claim 1, wherein:
   the first audible signals are provided from the wireless microphone to the base unit via a first wireless connection when the wireless microphone is detached from the base unit; and
   the second audible signals are received at the wireless earpiece from the base unit via a second wireless connection different from the first wireless connection when the wireless earpiece is detached from the base unit.

* * * * *

UNITED STATES PATENT AND TRADEMARK OFFICE
CERTIFICATE OF CORRECTION

PATENT NO.         : 8,489,151 B2
APPLICATION NO.    : 11/120455
DATED              : July 16, 2013
INVENTOR(S)        : Joseph A. Van Engelen et al.

Page 1 of 1

It is certified that error appears in the above-identified patent and that said Letters Patent is hereby corrected as shown below:

In the Claims

Col. 20, line 14, in claim 6: after "base unit" delete "base unit"
Col. 20, line 16, in claim 7: after "base unit" delete "base unit"

Signed and Sealed this
Twentieth Day of May, 2014

Michelle K. Lee
*Deputy Director of the United States Patent and Trademark Office*